US007591870B2

United States Patent
Simmons et al.

(10) Patent No.: US 7,591,870 B2
(45) Date of Patent: Sep. 22, 2009

(54) FILTER INSTALLATION KIT FOR USE WITH SUCH AS AN AIR CONDENSING UNIT

(75) Inventors: Jesse Kenneth Simmons, Commerce Township, MI (US); Brian Ross Simmons, White Lake, MI (US)

(73) Assignee: The Newway Company, Inc., Milford, MI (US)

( * ) Notice: Subject to any disclaimer, the term of this patent is extended or adjusted under 35 U.S.C. 154(b) by 212 days.

(21) Appl. No.: 11/538,726

(22) Filed: Oct. 4, 2006

(65) Prior Publication Data

US 2008/0098702 A1    May 1, 2008

(51) Int. Cl.
*B01D 46/10* (2006.01)
(52) U.S. Cl. .......................... 55/511; 55/385.1; 55/491; 55/495; 55/500; 62/259.1; 62/507
(58) Field of Classification Search ................ 55/385.1, 55/422, 490, 491, 496, 500, 509, 495, 511; 62/259.1, 507
See application file for complete search history.

(56) References Cited

U.S. PATENT DOCUMENTS

| | | | |
|---|---|---|---|
| 3,320,996 A * | 5/1967 | Singer | 150/165 |
| 5,156,662 A * | 10/1992 | Downing et al. | 55/493 |
| 5,529,593 A | 6/1996 | Simmons | |
| 5,809,800 A * | 9/1998 | Deal | 62/507 |
| 5,997,674 A | 12/1999 | Rakocy et al. | |
| 6,197,077 B1 * | 3/2001 | Simmons et al. | 55/351 |
| 6,221,120 B1 * | 4/2001 | Bennington et al. | 55/385.1 |
| 6,430,954 B1 * | 8/2002 | Smith | 62/259.1 |
| 6,595,017 B1 * | 7/2003 | Teahan | 62/259.1 |
| 6,708,514 B1 * | 3/2004 | Miller | 62/259.1 |
| 6,743,282 B2 | 6/2004 | Najm | |
| 6,991,665 B1 | 1/2006 | Allen et al. | |
| 7,032,402 B2 * | 4/2006 | Braswell | 62/259.1 |
| 7,140,194 B1 * | 11/2006 | Miller | 62/259.1 |
| 7,332,011 B1 * | 2/2008 | Sandberg | 55/491 |
| 7,387,654 B1 * | 6/2008 | Byers | 55/385.1 |

* cited by examiner

*Primary Examiner*—Duane Smith
*Assistant Examiner*—Robert A Clemente
(74) *Attorney, Agent, or Firm*—Gifford, Krass, Sprinkle, Anderson & Citkowski, P.C.

(57) ABSTRACT

A retrofit installation kit for use with such as an exteriorly located air conditioner condensing unit. The kit includes a flexible filtration screen and a set of customized fasteners which substitute for existing fasteners used to hold together the outer sheathing of the unit frame. The substitution of fasteners for the typical mounting screws utilized in the original unit construction precludes the possibility of such as damaging the unit due to drilling new fastener holes, this running the risk of rupturing fluid coils within the unit, or damaging other sensitive electrical or mechanical components.

20 Claims, 3 Drawing Sheets

FILTER INSTALLATION KIT FOR USE WITH SUCH AS AN AIR CONDENSING UNIT

BACKGROUND OF THE INVENTION

1. Field of the Invention

The present invention relates generally to filter screen assemblies for use in such as exterior located air treatment units. More specifically, the present invention teaches a retrofit installation kit for use with such as an exteriorly located air conditioner condensing unit. The kit includes a flexible filtration screen and a set of customized fasteners which substitute for existing fasteners used to hold together the unit frame. The substitution of fasteners for the typical mounting screws utilized in the original unit construction precludes the possibility of such as damaging the unit due to drilling new fastener holes, this running the risk of rupturing fluid coils within the unit, or damaging other sensitive electrical or mechanical components.

2. Description of the Prior Art

The prior art is well documented with varying types of filter screen assemblies, such as for use with conventional air intake units. The objective of such assemblies is to provide effective filtration of external contaminants from clogging or otherwise disrupting the operation of the externally located unit.

A first such example is set forth in U.S. Pat. No. 5,529,593, issued to Simmons, and which teaches a filter screen assembly for use with an air intake unit, such as having a top, bottom and sides. A flexible screen is provided as a wound roll and onto a spindle. The spindle is held within a vertically extending container secured to the side of the unit. The container has a bottom and side walls which define an open interior for receiving the spindle and which is rotatably supported at opposite ends within the container. The flexible screen is unwound from the spindle and is attached to the sides of the unit at predetermined locations around the periphery of unit. The spindle may further be dismounted from the container and the flexible screen manually rewound onto the spindle.

U.S. Pat. No. 6,743,282, issued to Najm, teaches a furnace filter system or kit for installation on an existing furnace duct having upper and lower supply roll supports respectively mounted on the top and bottom walls of the duct adjacent one side wall of the duct for removably receiving a supply roll of filter media therebetween. Of note, upper and lower take-up roll supports are respectively mounted on the top and bottom walls of the duct adjacent the other side thereof for removably receiving the filter media take-up roll therebetween.

U.S. Pat. No. 5,997,674, issued to Rakocy et al., teaches an air purifier filter and method of manufacturing for use with an air purifier having a base assembly and grill. The base and filter assemblies include adjoining walls having openings which are substantially smaller in area than the areas of the adjoining walls and area through which air is drawn in through the filter assembly. A resilient gasket includes a passage approximately the size of the openings and is positioned between the adjoining walls. The filter assembly is drawn towards the base assembly when the fan is operated, thereby enhancing the seal formed by the gasket against the adjoining walls. Unfiltered air is accordingly unlikely to bypass the filter assembly. The air filter is manufactured through the use of a back plate having oblique end portions and includes such as a pleated HEPA material arranged in a U-shaped configuration, the ends thereof being adhered to the oblique end portions. Top and bottom walls are then applied to the resulting structure.

Finally, U.S. Pat. No. 6,991,665, issued to Allen et al., teaches a filter wrap for a cylindrical filter having a sheet with an interior side facing the filter when the sheet is wrapped on the filter, and an exterior side. An edge of the sheet defines a main opening to the interior for receiving the filter. At least one strap is provided for the wrap with one end attached to the sheet. The strap has another accessible distal end. Pulling on the strap everts the sheet as it is pulled off of the filter. This results in trapping debris residing on the exterior of the sheet within the sheet once it is everted during removal of the wrap from the filter. Installation and removal can be performed while the protected equipment remains in operation.

SUMMARY OF THE PRESENT INVENTION

As previously described, the present invention teaches a retrofit installation kit for use with such as an exteriorly located air conditioner condensing unit. The kit includes a flexible filtration screen and a set of customized fasteners which substitute for existing fasteners used to hold together the unit frame, these fasteners typically being utilized in the original manufacture of the frame or housing associated with the air handling unit. The present invention further contemplates the addition of washers into the kit and, in use with such as the manufacturers sheathing fasteners, provide for retrofit installation of the filter screen.

The substitution of fasteners for the typical mounting screws (or alternate use of the screws with additional washers) utilized in the original unit construction precludes the possibility of damaging the unit. This is otherwise due to drilling new fastener holes for securing the filter screen media against the intake openings associated with the unit, this running the risk of rupturing fluid coils within the unit or damaging other sensitive electrical or mechanical components.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
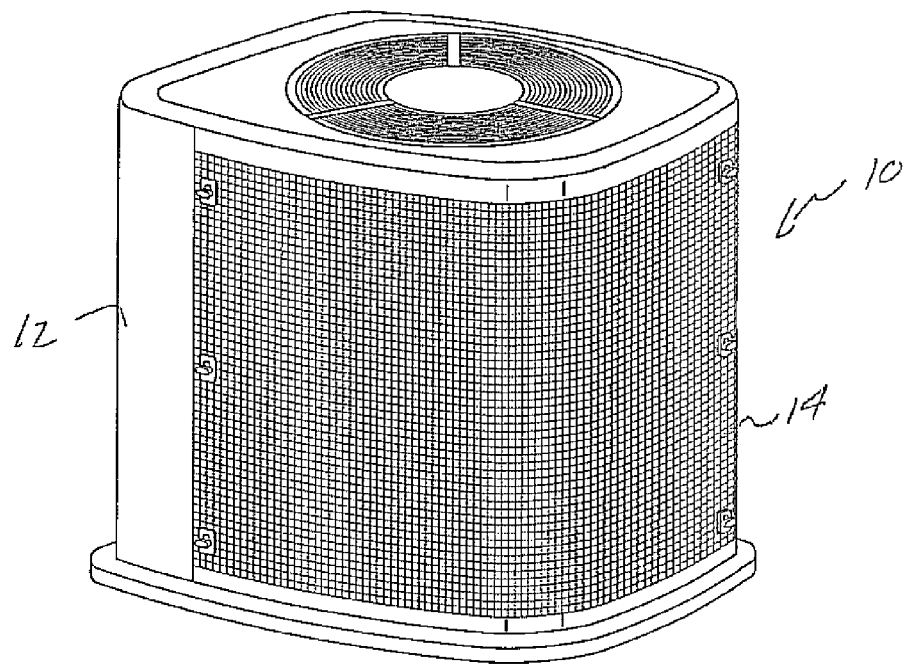
FIG. 1 is an environmental perspective view of the retrofit installation kit in place upon an externally located air condensing unit and according to the present invention.

Referring to FIG. 1, a retrofit installation kit is illustrated at 10 for use with such as an exteriorly located air conditioner condensing unit 12. As will be subsequently described, the kit includes a flexible filtration screen 14 (such as constructed without limitation from any type of mesh like or air permeable fiber material and including without limitation polyester, wire mesh or other constituted material) and any one type of a number of contemplated and customized fasteners, these substituting for existing fasteners used to hold together the outer sheathing associated with the unit frame.

As previously stated, the substitution of fasteners for the typical mounting screws utilized in the original unit (or alternately the addition of washers in use with the manufacturer's screws) precludes the possibility of such as damaging the unit due to the requirement of drilling new fastener holes for securing the screen. This entails the risk of rupturing fluid coils within the unit or damaging other sensitive electrical or mechanical components.

Figure 2:
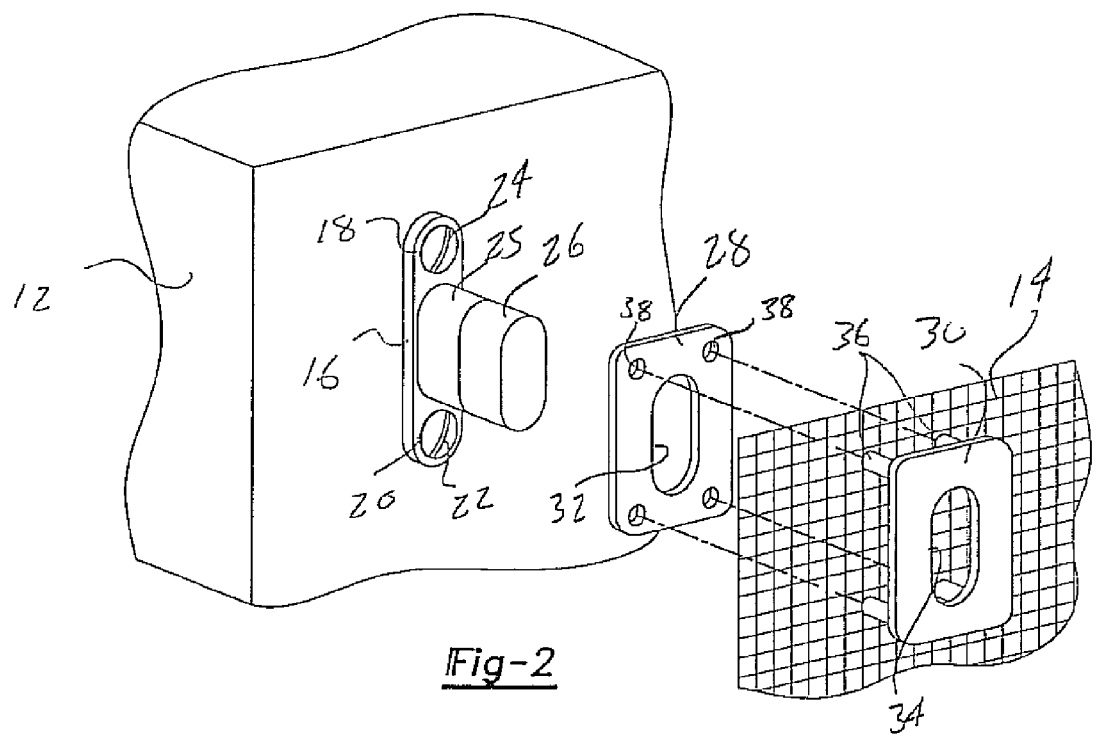
FIG. 2 is an enlarged exploded view of a first type of selected retrofit fastener, also illustrated in FIG. 1, and in use with the kit assembly.
Figure 3:
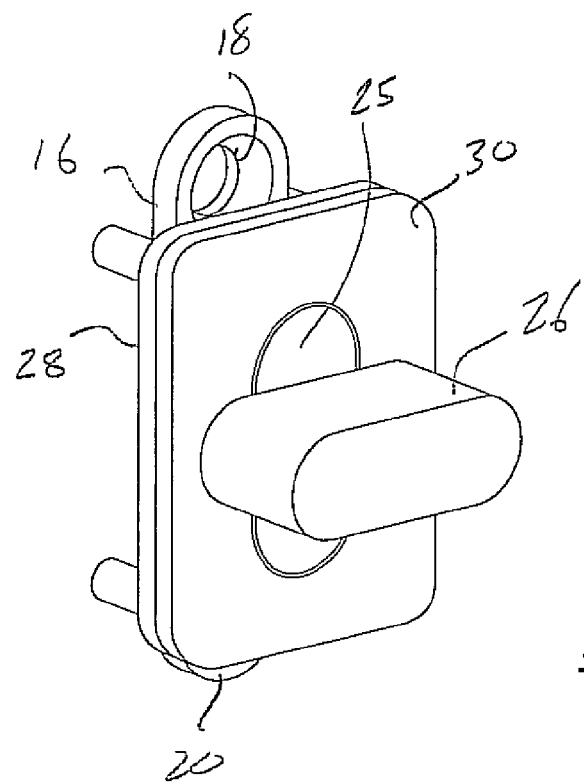
FIG. 3 is an assembled and enlarged perspective of the fastener illustrated in FIG. 2.

Referring again to FIG. 1, the environmental perspective view 10 is shown of the retrofit installation kit in place upon an externally located air condensing unit 12, this being but one example of an air handling unit (such as typically externally mounted) and with which the retrofit kit of the present invention is capable of being utilized. Referring further to FIGS. 2 and 3, respective enlarged exploded and assembled views of a first type of selected retrofit fastener, this again also being of the type illustrated in FIG. 1, is shown and in use with the kit assembly.

The embodiment of FIGS. 1-3 incorporates a plurality of individual and projecting base components, see at 16, these secured to at least one associated fastener mounting location of the air handling unit 12 and such as which is conventionally designed to permit the outer sheathing or framework associated with the unit to be assembled together. Each of the base components 16 includes at least one, and typically a pair, of mounting apertures 18 and 20, these accepting associated screws (22 and 24 as shown in FIG. 2) of which at least one may be associated with an existing and manufacturer installed fastener mounting location.

The base component 16 includes a fixed projecting portion 25 from which an end projecting (typically biasingly assembled) and rotatable portion 26 extends, this for securing through a location of the screen 14 at the mounting location. In a preferred assembly, a pair of substantially disk shaped and sandwiching elements are provided, see at 28 and 30, these being constructed of any rigid material (such as a plastic or lightweight metal) and which are arranged upon opposite surfaces of the screen 14 perimeter defining edge location.

An aligning aperture is defined within each of the disk elements (see as referenced at 32 and 34 by interiorly extending surfaces defined within each of the disc faces) these collectively defining a seating location through which the end projecting component 26 extends upon the disk elements 28 and 30 being assembled and the interposed portion of the screen 14 being removed, such as further by utilizing a blade edge to trim the screen portion revealed by the aperture defining edges 32 and 34. A first selected disk element (e.g. at 30) may exhibit a plurality of peripherally spaced apart tabs 36, a second selected disk element (e.g. as further shown at 28) includes a mating arrangement of recesses 38, through which the tabs 36 seat in piercing fashion through the screen 14, and in order to mount the disk elements 28 and 30 theretogether in frictionally adhering fashion.

Figure 4:
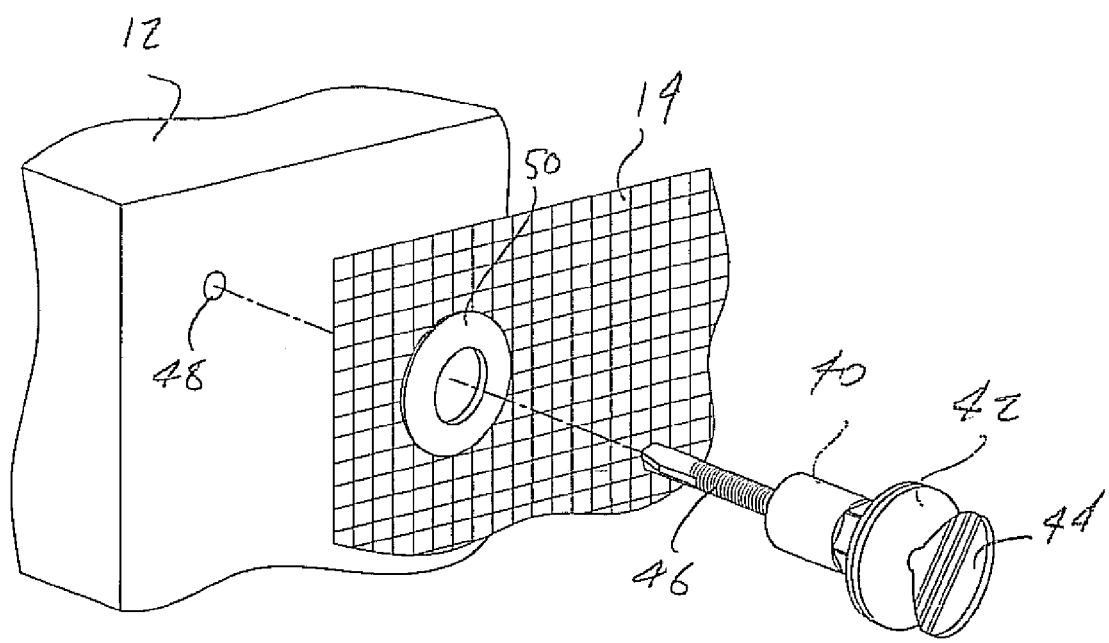
FIG. 4 is an enlarged exploded view of a second type of retrofit fastener.

Referring further to FIG. 4, an enlarged exploded view is shown at 40 of a second type of retrofit fastener in use with the filter screen 14 kit. In particular, the fastener 40 may include such as a modified wing screw exhibiting an annular enlarged end portion 42 located proximate a wing portion 44 and from which extends an externally threaded portion 46 for inserting through such as a manufacturer installed fastener mount (aperture 48). The arrangement of FIG. 4 includes such as a washer 50 which may be additionally (or alternatively) provided in adhering fashion against a surface of the screen 14 and which may cooperate with the screw 40 to secure the associated edge location of the screen against the air intake unit 12.

Figure 5:
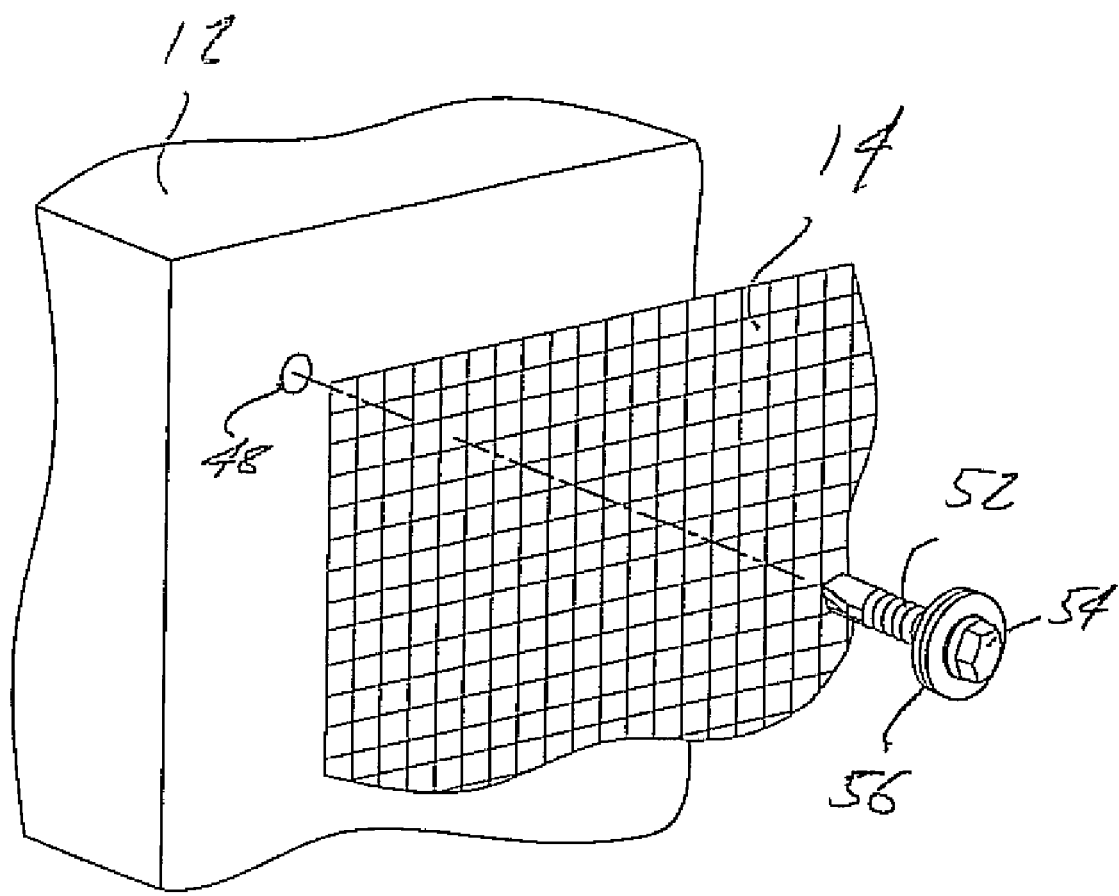
FIG. 5 is an enlarged exploded view of a third type of retrofit fastener.

Referring finally to FIG. 5, an enlarged exploded view is shown at 52 of a further type of retrofit fastener, this such as capable of being alternately provided to that shown at 40 in FIG. 4, and which may include a hex headed screw end 54 from which proximately extends an annular enlarged portion 56. In the arrangement of FIG. 5, the washer 50 shown in FIG. 4 is substituted by either a single or multiple washers (e.g. the annular enlarged portions 56), either integrally formed with the fastener 52 or installable thereupon. The conventional fastener mount is again shown at 48 in FIG. 5, similarly to that previously shown in FIG. 4.

Having described my invention, other and additional preferred embodiments will become apparent to those skilled in the art to which it pertains, and without deviating from the scope of the appended claims.

We claim:

1. A retrofit installation kit for use with an air handling unit, comprising:
    a flexible filtration screen having a specified shape and size dimensioned to substantially cover an air intake opening associated with the unit;
    a set of retrofit fasteners substitutable for existing fasteners and engageable with manufacturer installed fastener mounts for securing together an outer sheathing associated with the unit, said retrofit fasteners additionally securing edge locations of said screen;
    each of said retrofit fasteners exhibiting a specified shape and size and further comprising a projecting base component secured to at least one associated fastener mount and adapting to seating through an aperture associated with a proximate edge location of said screen; and
    the substitution of fasteners precluding the possibility of such as damage to the unit resulting from drilling new fastener holes, including at least one of the rupturing of fluid transfer coils within the unit or damage to interior electrical or mechanical components.

2. The kit as described in claim 1, said base component exhibiting a specified shape and size and further comprising an end projecting and rotatable component for securing said screen at said mounting location.

3. The kit as described in claim 2, further comprising a pair of substantially disk shaped and sandwiching elements being arranged upon opposite surfaces of said screen, an aligning aperture defined within disk elements defining a seating location through which said end projecting component extends.

4. The kit as described in claim 3, further comprising a first selected disk element exhibiting a plurality of peripherally spaced apart tabs, a second selected disk element including a mating arrangement of recesses through which said tabs seat in piercing fashion through said screen and in order to mount said disk elements thereto.

5. The kit as described in claim 1, further comprising each of said retrofit fasteners exhibiting a specified shape and size and further comprising a modified wing screw exhibiting an annular enlarged end.

6. The kit as described in claim 5, further comprising a washer adhering against a surface of said flexible screen and through which inserts an exteriorly threaded stem portion associated with said retrofit wind screw.

7. The kit as described in claim 1, further comprising each of said retrofit fasteners exhibiting a specified shape and size and further comprising a hex head screw exhibiting an annular enlarged end.

8. The kit as described in claim 1, said screen exhibiting a mesh-like consistency and further comprising at least one of a polyester and a wire mesh material.

9. A retrofit installation kit for use with an air handling unit, comprising:
    a flexible filtration screen having a specified shape and size dimensioned to substantially cover an air intake opening associated with the unit;

a retrofit addition associated with existing fasteners and engageable with manufacturer installed fastener mounts for securing together an outer sheathing associated with the unit, said retrofit additionally securing edge locations of said screen; and said retrofit addition exhibiting a specified shape and size and further comprising a washer adhering against a surface of said flexible screen and through which inserts an exteriorly threaded portion associated with said fastener;

the substitution of fasteners precluding the possibility of such as damage to the unit resulting from drilling new fastener holes, including at least one of the rupturing of fluid transfer coils within the unit or damage to interior electrical or mechanical components.

10. The kit as described in claim 9, said screen exhibiting a mesh-like consistency and further comprising at least one of a polyester and a wire mesh material.

11. The kit as described in claim 9, further comprising a retrofit screw fastener in substitution for the existing fastener, said retrofit fastener including at least an annular enlarged portion for abutting engaging edge locations associated with said screen in sandwiching fashion between said fastener and said washer.

12. A retrofit installation kit for use with an air handling unit, comprising:
   a flexible filtration screen exhibiting a mesh-like consistency and having a specified shape and size dimensioned to substantially cover an air intake opening associated with the unit;
   a set of retrofit fasteners substitutable for existing fasteners which are engageable with manufacturer installed fastener mounts conventionally employed for securing together an outer sheathing associated with the unit, said retrofit fasteners, in addition to substituting therefor, additionally securing edge locations of said screen to the exterior of the air handling unit; and
   each of said retrofit fasteners exhibiting a specified shape and size and further comprising a projecting base component secured to at least one associated fastener mount and adapting to seating through an aperture associated with a proximate edge location of said screen;
   the substitution of fasteners precluding the possibility of such as damage to the unit resulting from drilling new fastener holes, including at least one of the rupturing of fluid transfer coils within the unit or damage to interior electrical or mechanical components.

13. The kit as described in claim 12, said base component exhibiting a specified shape and size and further comprising an end projecting and rotatable component for securing said screen at said mounting location.

14. The kit as described in claim 13, further comprising a pair of substantially disk shaped and sandwiching elements being arranged upon opposite surfaces of said screen, an aligning aperture defined within disk elements defining a seating location through which said end projecting component extends.

15. The kit as described in claim 14, further comprising a first selected disk element exhibiting a plurality of peripherally spaced apart tabs, a second selected disk element including a mating arrangement of recesses through which said tabs seat in piercing fashion through said screen and in order to mount said disk elements thereto.

16. The kit as described in claim 12, further comprising each of said retrofit fasteners exhibiting a specified shape and size and further comprising at least one of a modified wing screw and a hex head screw.

17. The kit as described in claim 16, further comprising an annular enlarged portion adhering against a surface of said flexible screen upon installation of said retrofit fastener and through which inserts an exteriorly threaded stem portion associated with said fastener.

18. A retrofit installation kit for use with an air handling unit, comprising:
   a flexible filtration screen having a specified shape and size dimensioned to substantially cover an air intake opening associated with the unit;
   a set of retrofit fasteners substitutable for existing fasteners and engageable with manufacturer installed fastener mounts for securing together an outer sheathing associated with the unit, said retrofit fasteners additionally securing edge locations of said screen; and
   each of said retrofit fasteners exhibiting a specified shape and size and further comprising a modified wing screw exhibiting an annular enlarged end;
   the substitution of fasteners precluding the possibility of such as damage to the unit resulting from drilling new fastener holes, including at least one of the rupturing of fluid transfer coils within the unit or damage to interior electrical or mechanical components.

19. A retrofit installation kit for use with an air handling unit, comprising:
   a flexible filtration screen having a specified shape and size dimensioned to substantially cover an air intake opening associated with the unit;
   a set of retrofit fasteners substitutable for existing fasteners and engageable with manufacturer installed fastener mounts for securing together an outer sheathing associated with the unit, said retrofit fasteners additionally securing edge locations of said screen; and
   each of said retrofit fasteners exhibiting a specified shape and size and further comprising a hex head screw exhibiting an annular enlarged end;
   the substitution of fasteners precluding the possibility of such as damage to the unit resulting from drilling new fastener holes, including at least one of the rupturing of fluid transfer coils within the unit or damage to interior electrical or mechanical components.

20. A retrofit installation kit for use with an air handling unit, comprising:
   a flexible filtration screen exhibiting a mesh-like consistency and having a specified shape and size dimensioned to substantially cover an air intake opening associated with the unit;
   a set of retrofit fasteners substitutable for existing fasteners which are engageable with manufacturer installed fastener mounts conventionally employed for securing together an outer sheathing associated with the unit, said retrofit fasteners, in addition to substituting therefor, additionally securing edge locations of said screen to the exterior of the air handling unit; and
   each of said retrofit fasteners exhibiting a specified shape and size and further comprising at least one of a modified wing screw and a hex head screw;
   the substitution of fasteners precluding the possibility of such as damage to the unit resulting from drilling new fastener holes, including at least one of the rupturing of fluid transfer coils within the unit or damage to interior electrical or mechanical components.

* * * * *